(No Model.) 2 Sheets—Sheet 2.
J. G. BEATTIE.
FLUSHING APPARATUS FOR WATER CLOSETS.
No. 548,288. Patented Oct. 22, 1895.
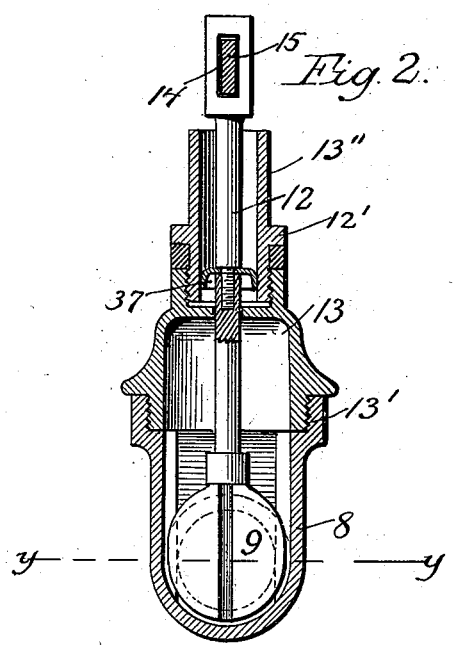
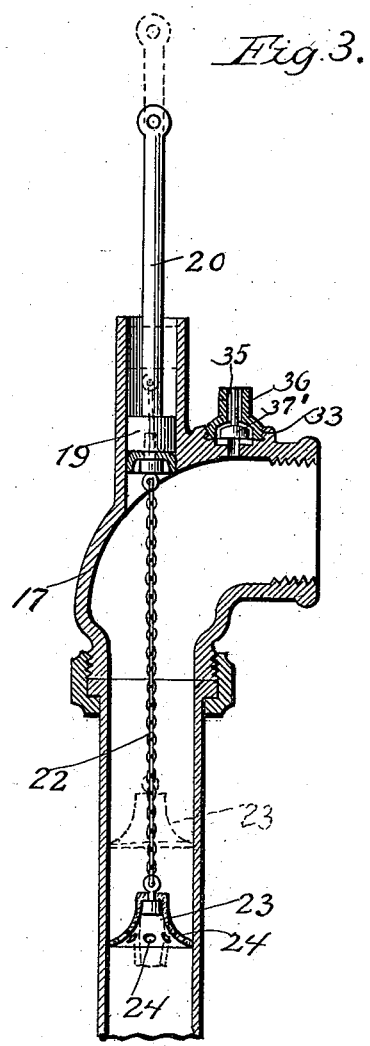
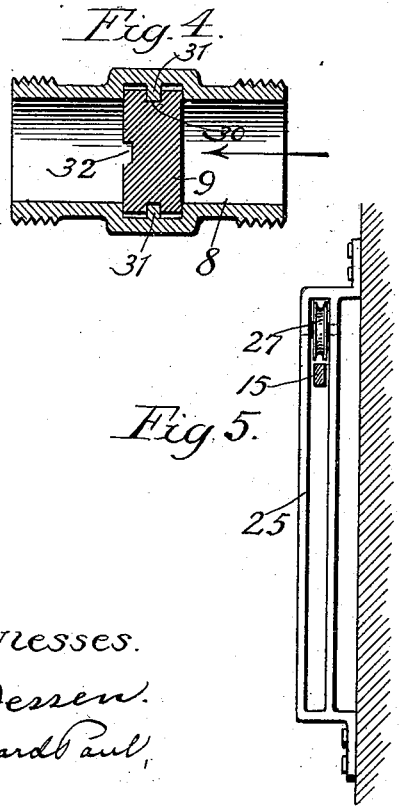
Witnesses.
J. Jessen
Richard Paul
Inventor.
John G. Beattie
Paul Crawley
his Attorneys.

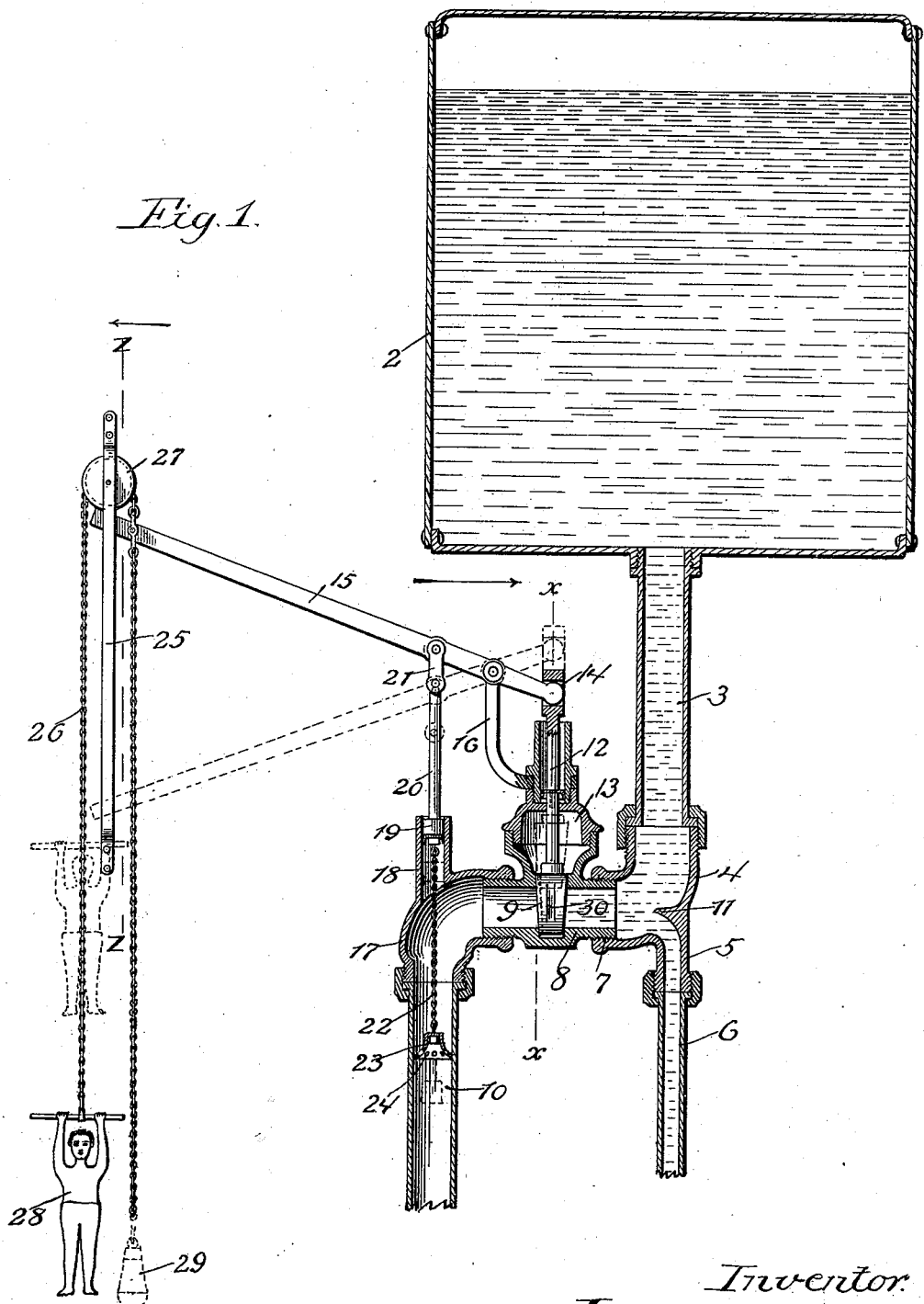

UNITED STATES PATENT OFFICE.

JOHN G. BEATTIE, OF MINNEAPOLIS, MINNESOTA, ASSIGNOR OF ONE-HALF TO JOHN KING, OF SAME PLACE.

FLUSHING APPARATUS FOR WATER-CLOSETS.

SPECIFICATION forming part of Letters Patent No. 548,288, dated October 22, 1895.

Application filed November 19, 1894. Serial No. 529,244. (No model.)

*To all whom it may concern:*

Be it known that I, JOHN G. BEATTIE, of Minneapolis, county of Hennepin, State of Minnesota, have invented certain new and useful Improvements in Flushing Apparatus for Water-Closets, of which the following is a specification.

My invention relates to means for flushing water-closet bowls, and particularly to the mechanism for automatically closing the valve leading to the tank after the operation of flushing, by which the tank is emptied of the water contained therein.

The object of my invention is to provide very simple means for closing the valve, and the device is designed in this respect as an improvement over that shown and described in my application, Serial No. 505,661, filed March 30, 1894.

The further object of my invention is to provide a valve-closing device which shall be absolutely noiseless and sure of closing the valve after the operation of flushing.

My invention consists, generally, in the combination of a tank, a pipe leading therefrom, a valve in said pipe, and a mechanism connected to said valve for closing the same when the tank is emptied of its contents, all as hereinafter described, and particularly pointed out in the claims.

The invention will be more readily understood by reference to the accompanying drawings, forming part of this specification, in which—

Figure 1 is a vertical sectional view of a flushing apparatus embodying my invention. Fig. 2 is a sectional view of a valve arranged in the flushing-pipe on the line $x$ $x$ of Fig. 1. Fig. 3 is a sectional view of the mechanism for closing the valve. Fig. 4 is a view on the line $y$ $y$ of Fig. 2. Fig. 5 is a side view of the bracket or guide and pulley over which the cord or chain passes that is connected to the valve-operating mechanism on the line $z$ $z$ of Fig. 1.

In the drawings, 2 represents a closed tank of any suitable size, made both air and water tight. A pipe 3 leads from the bottom of the tank and is connected to the elbow 4, having the downward projection 5, to which the supply-pipe 6 is connected, and the opening 7, in which is inserted one end of the horizontal pipe 8, containing the gate-valve 9 and leading to the discharge-pipe 10. The elbow 4 is provided with the wing or projection 11 for the purpose hereinafter described.

The gate-valve 9 is arranged to operate vertically, and its stem 12 passes up through a cap 13, which screws into a threaded cup-shaped projection 13' on the upper side of the pipe 8, and a threaded collar 13'', which screws into the cap 13. The collar 13'' is provided with a shoulder 12, which rests upon the top of the cap 13. The stem 12 of the valve 9 is in two parts, as shown in Fig. 2, the upper portion thereof having a threaded extension to screw into the upper end of the lower portion. A leather or rubber cup 37 is arranged between the two portions of the stem 12 and moves up and down therewith, fitting closely inside the collar 13''.

The valve 9 is provided with vertical slots 30 to receive the guides 31 on the inside of the pipe 8. The valve is further provided with a slot 32 to permit the escape of water from the part 13'' on the upper side of the pipe after the operation of flushing. The upper end of the stem 12 is provided with a slot 14, in which slides the end of the lever 15, that is pivotally supported upon an arm 16, extending outwardly and upwardly from the cap 13. Between the pipe 8 and the discharge-pipe 10 is provided an elbow 17, having an upward projection 18 in line with the discharge-pipe 10. The elbow 17 is also provided with an opening 33 through the upper side thereof, leading through an opening 35 in a cap 36 to the outside of the pipe. A valve 37' is provided to close the opening 35 while the water is flowing down the pipe. When the water ceases to flow, the valve drops back to its normal position over the opening 33, and slots on the under side of the valve serve to admit air to the pipe 8. This device may be omitted, if desired. The upward projection 18 is open at the top and a plunger 19 is arranged to work up and down therein and is provided with a stem or rod 20, pivotally connected to the lever 15 by a link 21. A chain 22 is attached to the lower side of the plunger, and to the lower end of the chain is attached a bell-shaped leather or rubber cup 23, having a series of openings 24.

The cup 23 fills the discharge-pipe 10 and is arranged to move up and down therein.

The outer end of the lever 15 is arranged to move up and down in a bracket or guide 25, secured to the wall at any convenient point. A chain 26 is attached to the end of the lever, one end passing over the pulley 27, arranged in the top of the bracket or guide 25 and having a weight 28 at its lower end in the shape of the figure of a boy, and its other end depending from the under side of the lever 15 and having a knob or handle 29 at its lower end, as shown by dotted lines in Fig. 1.

The operation of the device is as follows: The valve being closed the tank is filled with water through the supply-pipe 6. When it is desired to flush the bowl, the lever 15 is drawn down by the chain 26, the valve 9 will be raised, and the piston or plunger 19 forced to the bottom of the projection 18. In this position the chain 22 between the plunger and cup will be slack and the weight of the water flowing down the pipe from the tank will cause the cup to collapse, as indicated by dotted lines in Fig. 3. As soon as the water has passed out of the tank and the pressure is removed from the cup 23 it returns to its normal shape, and the suspended weight 28 raises the outer end of the lever 15, closing the valve 9 and raising the cup back to its original position, and any water that may be left in the discharge-pipe above the cup will pass down through the openings 24 therein.

When the valve 9 is opened the water from the supply-pipe will be directed toward the opening through the valve by the wing or projection 11, as shown in Fig. 1, thus producing an ejector action and causing the water to flow freely from the tank.

Having thus described my invention, I claim as new and desire to secure by Letters Patent—

1. The combination, of a tank, a pipe leading therefrom, a gate valve connected therewith to control the flow of water from said tank, a lever for operating said valve, a discharge pipe leading from the opposite side of said valve a cup to move up and down in said discharge pipe, and to be compressed by the weight of the water in the tank and to return to its normal shape and close the pipe when the pressure is removed, and means connecting said cup with said lever, whereby the lever will be held in a depressed position by said cup and the valve held open until the water has passed out of said tank, substantially as described and for the purpose set forth.

2. The combination of a tank, a pipe leading therefrom, a gate valve connected therewith to control the flow of water from said tank, a lever for operating said valve, a discharge pipe leading from the opposite side of said valve, said discharge pipe being provided with an upward projection, a piston to operate therein, the stem of said piston being connected to said lever, a bell-shaped rubber cup to move up and down in said discharge pipe and to be compressed by the pressure of water in the tank and to return to its normal shape and close the pipe when the pressure is removed and means connecting said cup and said piston, substantially as described.

3. The combination, of a closed tank, a pipe leading therefrom, a gate valve arranged to control the flow of water from said tank, a lever for operating said valve, a supply pipe leading into the said first named pipe between the tank and said valve and arranged to project a stream of water through said valve, a discharge pipe leading from the opposite side of the valve, said discharge pipe being provided with an upward projection, a piston to operate therein, the stem of said piston being connected to said lever, a bell shaped rubber cup connected to said piston and provided with a series of holes and adapted to be compressed by the pressure of water flowing from the tank and to return to its normal shape, closing the pipe and permitting the valve to be closed when the tank has been emptied of its contents, substantially as described.

4. The combination, of the tank, the pipe leading therefrom, the valve to control the flow of water from the tank, means for operating the valve, a flushing pipe leading from the opposite side of the valve, and means within said flushing pipe to be operated by the weight of the water therein for holding said valve open during the operation of flushing, and means without said pipe for closing said valve when the tank has been emptied of its contents, substantially as described.

5. The combination, of the closed tank, the pipe leading therefrom, a valve to control the flow of water from the tank, a flushing pipe leading from the opposite side of the valve, a suitable device arranged within said flushing pipe to be operated by the weight of the water for holding said valve open during the operation of flushing, said device being adapted to permit the water to pass by it in said pipe, and means without said pipe for returning said device to its normal position and closing said valve when the tank has been emptied of its contents, substantially as described.

6. The combination, of the tank, the pipe leading therefrom, the valve to control the flow of water from the tank, a supply pipe leading into said first named pipe between the tank and said valve, a discharge pipe leading from the opposite side of said valve, a suitable mechanism arranged within said discharge pipe to be operated by the weight of the water therein for holding said valve open during the operation of flushing, and means without said pipe for returning said mechanism and said valve to their normal positions when the tank has been emptied of its contents, substantially as described.

7. The combination, of the closed tank, the pipe leading therefrom, the valve to control the flow of water from said tank, the supply pipe leading into said pipe between the tank and said valve, a discharge pipe leading from the opposite side of said valve, a mechanism within said discharge pipe for holding said valve open during the operation of flushing, said mechanism partially filling said pipe and obstructing the flow of water therein, and means without said pipe for closing said valve when the tank has been emptied of its contents, substantially as described.

8. The combination, of the closed tank, the pipe leading therefrom, the valve to control the flow of water from said tank, a supply pipe leading into said first named pipe between the tank and said valve, a discharge pipe leading from the opposite side of said valve, a suitable mechanism arranged within said pipe to be operated by and partially obstruct the flow of water therein, said mechanism being adapted to hold said valve open during the operation of flushing and to permit it to be closed when the tank has been emptied of its contents, substantially as described.

In testimony whereof I have hereunto set my hand this 5th day of November, A. D. 1894.

JOHN G. BEATTIE.

In presence of—
C. G. HAWLEY,
RICHARD PAUL.